Jan. 31, 1939.  H. R. MINOR  2,145,731
METHOD OF MAKING CORRUGATED SPONGE RUBBER
Filed May 7, 1937
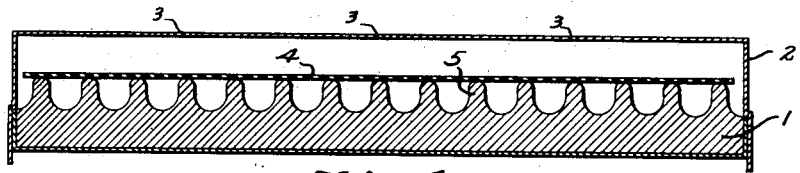
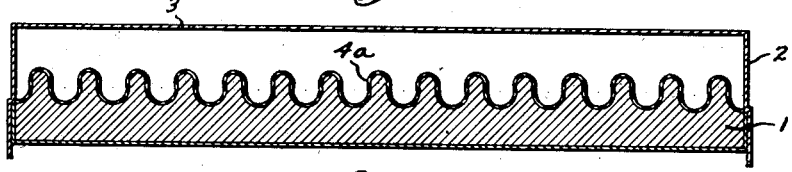
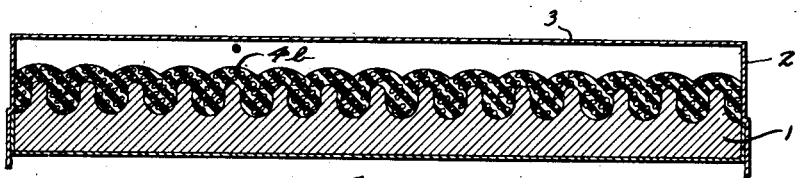
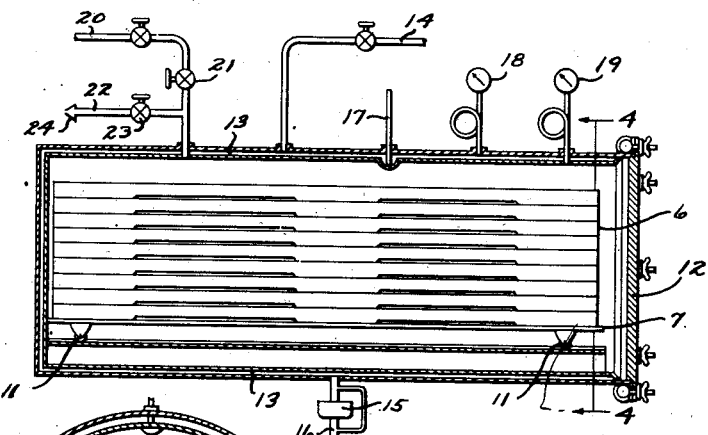
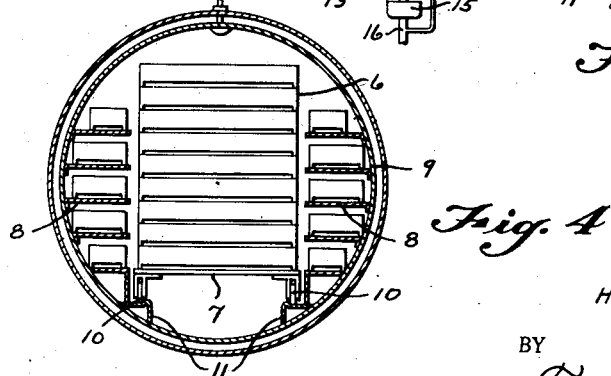
INVENTOR.
HENRY R. MINOR
BY
ATTORNEYS Patented Jan. 31, 1939

2,145,731

UNITED STATES PATENT OFFICE 2,145,731

METHOD OF MAKING CORRUGATED SPONGE RUBBER

Henry R. Minor, Dayton, Ohio, assignor to Industrial Process Corporation, Dayton, Ohio, a corporation of New York Application May 7, 1937, Serial No. 141,316

7 Claims. (Cl. 18—55)

My invention relates to a method of manufacturing sponge rubber and in particular the manufacture of sponge rubber in a variety of forms such as corrugations.

It is the object of my invention to provide a method by which rubber stock of the minimum thickness in which it can be suitably and readily handled can be converted into rubber sponge from stock which stretches to a thickness prior to being sponged that could not be handled.

It is my object to provide a method by which thin rubber stock of the minimum thickness enabling it to be handled can be laid upon the form which it is to assume as sponge; which thereafter upon being heated will conform and stretch over the form of the mold; and by a continuation of the method, will assume a relatively thick sponge character in the shape of the mold.

It is a further object to provide a method in which the configuration can be imparted to the sponge both on the top and bottom thereof by only having a bottom supporting mold.

It is a further object to provide a method in which these bottom molds can be nested one over the other in the heater and the sponge produced in large quantities with this simple apparatus in a common heater.

Referring to the drawing:

Figure 1 illustrates diagrammatically the side of a mold for making corrugated sponge rubber with a layer of 50-gauge rubber stock on top of the mold as it is laid in position prior to practicing the process.

Figure 2 is a similar view showing the rubber stock heated sufficiently to sink within the curvature of the mold and to stretch for that purpose to a thickness that is uniform over the mold but which, if the rubber stock was handled, would prove insufficiently strong to permit satisfactory handling.

Figure 3 is a similar view to Figure 2 after the rubber has been treated to cause it to sponge and before it has been removed from the mold.

Figure 4 is a diagrammatic cross-sectional view showing the arrangement of the support for the several molds within the carriage that is mounted within the heater.

Figure 5 is a longitudinal sectional view on the line 5—5 of Figure 4.

Referring to the drawing, 1 designates a corrugated metal mold. One of the advantages of my invention is that the mold may be made of a variety of materials and need not be a structure of great strength. It can be made of thin sheet metal, a die casting or casting of any type, and I have successfully used a mold of rubber or combined rubber and fabric. This configurated member 1 is placed within a container 2 which is provided with apertures 3 of any desired number or location, depending upon the character of the sponge that is to be produced, as more fully set forth, explained and claimed in my co-pending application Ser. No. 137,130, filed April 15, 1937.

The rubber is preferably supplied in a 50-gauge stock sheet 4. This sheet is approximately the lightest that can be handled with facility. It is laid across the surface of the configurations 5 of the configurated member 1. In practice I place a number of these molds and the containers 2 on shelves 6 of a truck 7 or upon shelves 8 on the side walls of an autoclave 9. The truck has wheels 10 travelling on the tracks 11 in the bottom of the autoclave. The door 12 is then closed. The autoclave is then provided with a steam jacket 13 to which steam is admitted through the pipe 14. 15 indicates a condensation trap in the exit line 16. 17 is a thermometer, 18 a steam gauge and 19 an autoclave pressure gauge. Carbon dioxide is supplied to the chamber by the pipe 20 controlled by the valve 21. It is released from the chamber through the discharge line 22 controlled by the valve 23 and through the nozzle 24.

The preferred process is that outlined in my co-pending application Ser. No. 137,129, filed April 15, 1937. The article produced by this present method is shown in my application Ser. No. 137,322, filed April 16, 1937.

When the rubber stock is placed within the autoclave, the stock is preliminarily impregnated and heated at a temperature below 140 degrees Fahrenheit and with a gas pressure from 100 to 170 pounds. Due to the thinness of the stock, it is possible to reduce this impregnation period to only 10 to 15 minutes and during that period, the stock 4 sinks down and follows the configurations 5 as at 4a in Figure 2. In doing so it stretches and becomes thinner. The stock is so thin that it could not be handled in such thinness in sheet form. However, it is thick enough to produce the sponge product desired and one of the advantages of my process, as well as one of its features, is to be able to utilize a sheet of rubber stock that is so thin it cannot be manually handled, and to do this by placing over the configurations a sheet that can be handled and then permitting that sheet during its initial stage of treatment to follow the configurations of the mold and in doing so to automatically stretch itself, reduce its thickness, and provide a uniform coating of rubber over the intricate configurations of the mold. The result is, when the rubber is sponged, 4b, that it is of the thickness desired but with the minimum amount of rubber stock employed so that the process is very economical and sponge rubber can be supplied where otherwise it would be prohibitive.

Likewise I am enabled, by using these relatively low temperatures and pressures, to employ the cheapest type of configurated molds and to have a large number of them for simultaneous treatment and sponging in a common autoclave, all without a prohibitive inventory in molds. Heretofore the use of molds, particularly with the higher pressure gases, has necessitated a very expensive investment in high pressure equipment and in the very rigid heavy molds necessary with such equipment. While my process and method are adaptable to such equipment, nevertheless it is not necessary.

After this preliminary heating and impregnation period of 10 to 15 minutes, I then turn on the steam to raise the heat of the rubber without causing an expansion other than the expansion of the gas cells in the rubber and continue heating until the rubber is thoroughly softened.

I also increase the gas pressure to a maximum of approximately 180 pounds and then release the gas while continuing the increase of temperature to approximately 260 degrees Fahrenheit, but so adjusting the release of the gas that it is substantially completed before or shortly after the rubber takes its final set of vulcanization, thereby using the expansion of the gas to secure the maximum of sponging of the rubber with the minimum of rubber stock and the minimum of gas.

Other gases may be employed other than carbon dioxide, but I prefer it for the purposes of this invention.

I therefore provide a process and a method of sponging rubber in which (a) I lay the thinnest sheet of stock that can be handled over the form to which the sponge is to be molded; (b) I simultaneously heat and preferably also impregnate with gas such sheet so that it is sufficiently plastic to follow the configurations of the mold and to uniformly thin itself for that purpose to a thickness which would make it impossible of manual handling. I then increase the temperature and the pressure to bring about suitable sponging of the rubber in the configuration desired and I have found that only the bottom mold is required due to the fact that the upper surface will evenly follow the configurations of the bottom mold without the necessity of a top mold, thereby further economizing on mold equipment.

The sharp drop-off in maximum pressure and the continued heating must be so adjusted by the user of this method so that the heat applied is not so great as to cause the rubber to set prior to the completion of the release of the gas, and the heat supplied must be sufficient to prevent the gas boiling out of the rubber entirely when the stock is not ready to take a set within a reasonable interval of time.

It will be understood that I desire to comprehend within my invention such modifications as may be clearly embraced within the claims and scope of my invention.

Having thus fully described my invention, what I claim as new and desire to secure by Letters Patent, is:

1. In a method of making a configurated sponge rubber product, the steps of providing a closed chamber having a mold part therein provided with configurations of such depths and widths that a sheet of rubber may sag down into the depression thereof and conform thereto when laid thereon and treated as hereinafter described; laying a sheet of rubber on said mold part, heating and introducing gas under pressure into said chamber to cause the rubber sheet to absorb gas and conform to the configuration of the mold part, regulating the heat and pressure within said chamber to cause the rubber to sponge and to completely fill the depressions, and to cause the upper surface of the rubber to have a puffed irregular formation of the general configuration of the mold part.

2. In a method of making a configurated sponge rubber product, the steps of providing a closed chamber having a mold part therein provided with a plurality of corrugations of such depths and widths that a sheet of rubber may sag down into the depressions thereof and conform thereto when laid thereon and treated as hereinafter described, laying a sheet of rubber on said corrugated mold part, heating and introducing gas under pressure into said chamber to cause the rubber sheet to absorb gas and conform to the corrugations of the mold part, regulating the heat and pressure within said chamber to cause the rubber to sponge and to completely fill the depressions, and to cause the upper surface of the rubber to have a puffed irregular formation of the general configuration of the mold part.

3. In a method of making a configurated sponge rubber product, the steps of providing a closed chamber having a mold part therein provided with a plurality of corrugations of such depths and widths that a sheet of rubber may sag down into the depressions thereof and conform thereto when laid thereon and treated as hereinafter described, laying a sheet of rubber on said corrugated mold part, heating and introducing gas under pressure into said chamber to cause the rubber sheet to absorb gas and conform to the corrugations of the mold part, regulating the heat and pressure within said chamber to cause the rubber to sponge and to completely fill the depressions, and to cause the upper surface of the rubber to have a puffed irregular formation of the general configuration of the mold part, but to an insufficient extent to cause the rubber to expand to a point where the rubber engages the top of the chamber.

4. In a method of making a configurated sponge rubber product, the steps of providing a closed chamber having a mold part therein provided with configurations of such depths and widths that a sheet of rubber may sag down into the depressions thereof and conform thereto when laid thereon and treated as hereinafter described; laying the sheet of rubber on said mold part, heating and introducing gas under pressure into said chamber to cause the rubber sheet to absorb gas and conform to the configuration of the mold part, simultaneously regulating the heat and pressure within said chamber to cause the rubber to sponge and to completely fill the depressions, and to cause the upper surface of the rubber to have a puffed irregular formation of the general configuration of the mold part.

5. In a method of making a configurated sponge rubber product, the steps of providing a closed chamber having a mold part therein provided with corrugations of such depths and widths that a sheet of rubber may sag down into the depressions thereof and conform thereto when laid thereon and treated as hereinafter described; laying the sheet of rubber of said mold part, heating and introducing gas under the pressure into said chamber to cause the rubber sheet to absorb gas and simultaneously regulating the heat and pressure within said chamber to cause the rubber to sponge and to completely fill the depressions, and to cause the upper surface of the rubber to have a puffed corrugated formation of the general configuration of the mold part.

6. In a method of making a configurated sponge rubber product, the steps of providing a closed chamber having a mold part therein provided with corrugations of such depths and widths that a sheet of rubber may sag down into the depressions thereof and conform thereto when laid thereon and treated as hereinafter described; laying the sheet of rubber on said mold part, heating and introducing gas under the pressure into said chamber to cause the rubber sheet to absorb gas and simultaneously regulating the heat and pressure within said chamber to cause the rubber to sponge and to completely fill the depressions, and to cause the upper surface of the rubber to have corrugated formation of the general configuration of the mold part, but without expanding the sponged rubber to a point where the sponging rubber engages the top of the chamber.

7. In a method of making a configurated sponge rubber product, the steps of providing a closed chamber having a mold part therein provided with corrugations of such depths and widths that a sheet of rubber may sag down into the depressions thereof and conform thereto when laid thereon when treated as hereinafter described; laying a sheet of rubber free from sponge ingredients on said mold part, heating and introducing gas under pressure into said chamber to cause the rubber sheet to absorb gas and to conform to the corrugations of the mold part, simultaneously regulating the heat within said chamber to cause the rubber to sponge and completely fill the corrugations and to cause the upper surface of the rubber to have a puffed formation of the general configuration of the mold part, but without expanding the sponged rubber to a point where the sponged rubber engages the top of the chamber.

HENRY R. MINOR.